A. KINGSBURY.
BEARING.
APPLICATION FILED DEC. 31, 1917.
1,428,640.
Patented Sept. 12, 1922.
3 SHEETS—SHEET 1.
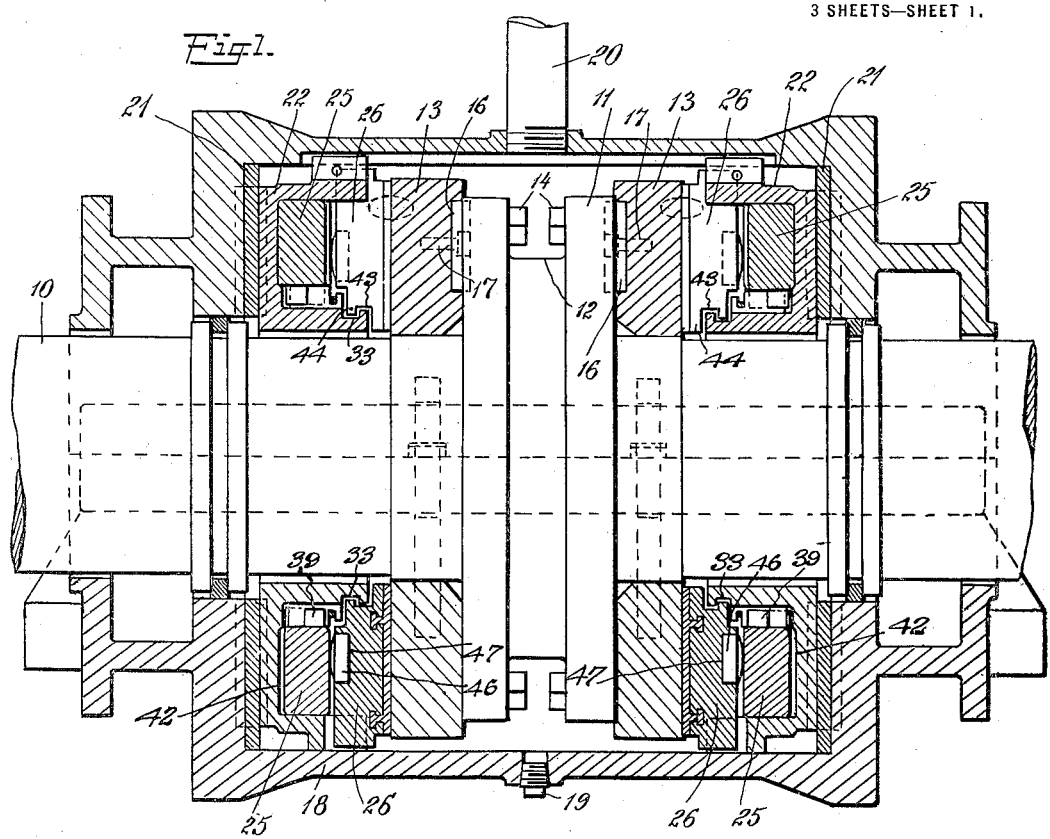
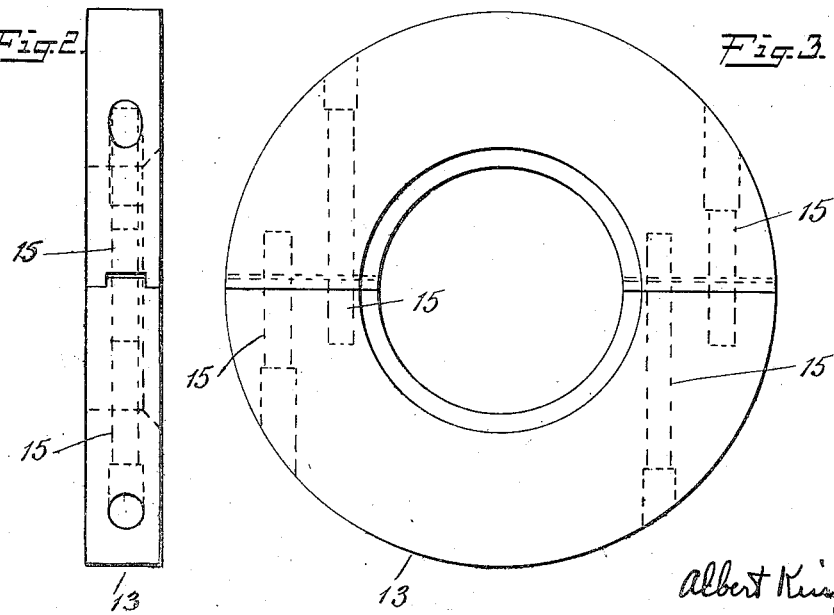
INVENTOR
Albert Kingsbury
BY
Marshall & Dearborn
ATTORNEYS A. KINGSBURY.
BEARING.
APPLICATION FILED DEC. 31, 1917.
1,428,640.
Patented Sept. 12, 1922.
3 SHEETS—SHEET 2.
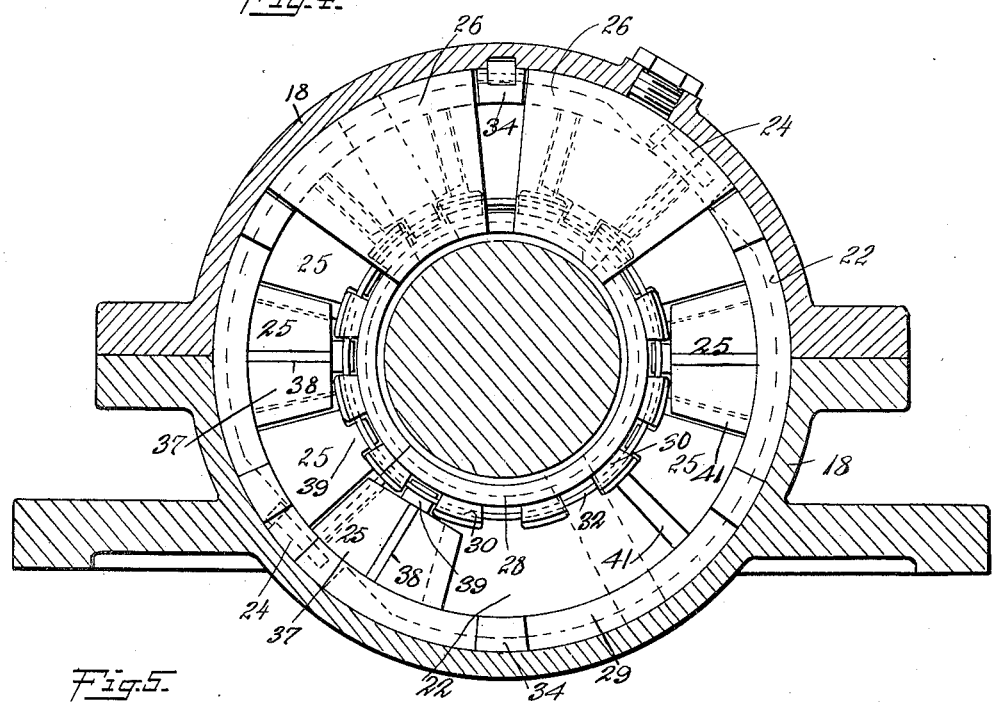
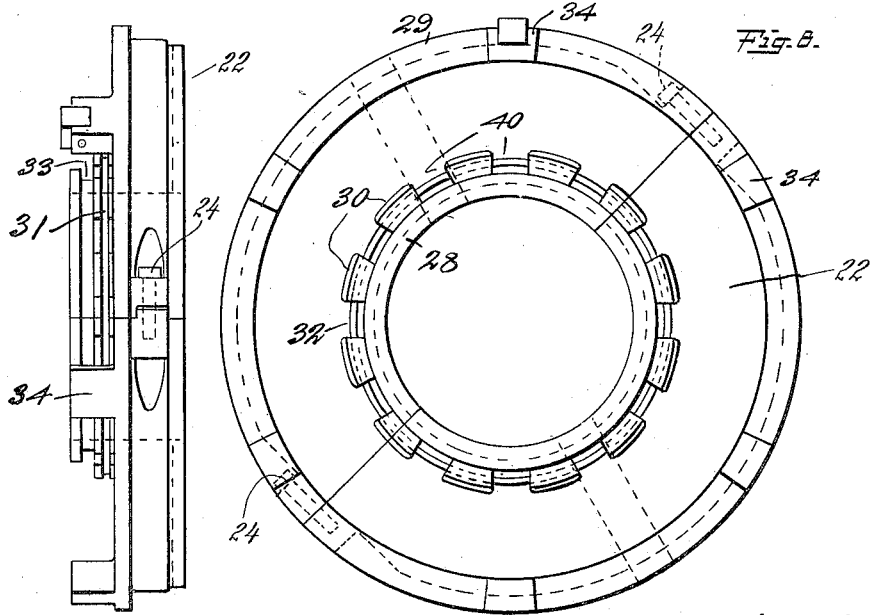
INVENTOR
Albert Kingsbury
BY
Marshall & Dearborn
ATTORNEYS

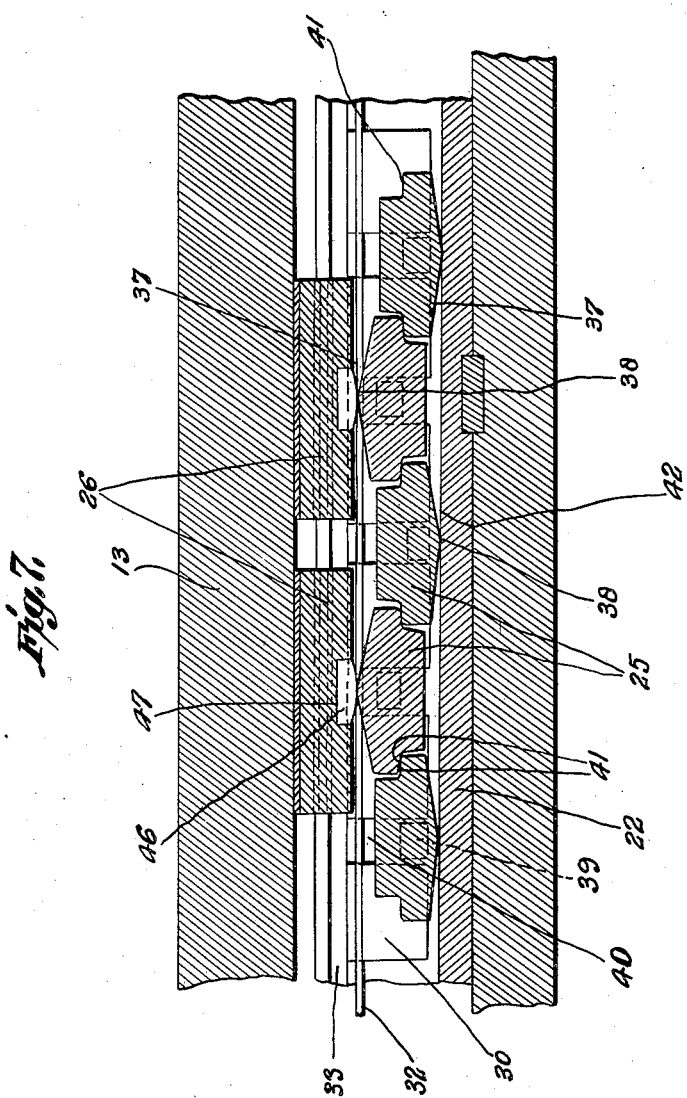

Patented Sept. 12, 1922.

1,428,640

UNITED STATES PATENT OFFICE.

ALBERT KINGSBURY, OF PITTSBURGH, PENNSYLVANIA.

BEARING.

Application filed December 31, 1917. Serial No. 209,617.

*To all whom it may concern:*

Be it known that I, ALBERT KINGSBURY, a citizen of the United States, and a resident of Pittsburgh, Allegheny County, and State of Pennsylvania, have invented certain new and useful Improvements in Bearings, of which the following is a specification, reference being had to the accompanying drawings, forming a part thereof.

My invention relates to bearings and particularly to thrust bearings of the type employing tiltable bearing segments or shoes.

One object of my invention is to provide a bearing of the aforesaid character which is so constructed that its members may be readily removed and replaced in sections as desired.

Another object of my invention is to provide an equalizing means for a plurality of bearing segments or shoes that has no tendency to spread or burst the base ring or like member on which the equalizing means is supported or with which it is engaged, in order that substantially all of the annular members of the bearing structure may be sectionalized without any danger of the sections being forced apart when the bearing is in operation.

Another object of my invention is to provide a flexible sub-divided pressure-distributing or equalizing structure which has only longitudinal or circumferential flexibility.

Another object of my invention is to provide a pressure-distributing structure of the type just characterized whereby the members thereof in engagement with the base may be supported along transverse lines about which said members may rock or tilt on axes which are radial or transverse of the bearing.

In order that my invention may be thoroughly understood I will now proceed to describe the same in the following specification by reference to one embodiment thereof, and then point out the novel features thereof in appended claims. The invention, however, is capable of receiving a variety of mechanical expressions, only one of which is shown on the accompanying drawings, and it is to be expressly understood that the drawings are for purposes of illustration only and are not to be construed as a definition of the limits of the invention, reference being had to the appended claims for that purpose.

Referring to the drawings:

Figure 1 is a longitudinal section of a thrust bearing arranged and constructed in accordance with my invention, and constituting an embodiment thereof.

Figures 2 and 3 show one of the thrust collars in detail.

Figure 4 is a transverse sectional elevation showing the arrangement of the bearing shoes and equalizer plates.

Figures 5 and 6 show the base ring in detail.

Fig. 7 is a sectional elevation drawn to a larger scale and showing a development into a single plane of a plurality of shoes and the equalizer plates on which the same are mounted.

In the structure illustrated, 10 designates a substantially horizontal shaft having an enlargement 11 in which is provided an annular groove 12, said enlargement carrying a pair of thrust collars 13 shown as subdivided and secured around the shaft on the respective sides of said enlargement and held in position in any suitable way, as by bolts 14 which extend through the respective parts of the enlargement from the groove 12 in which their heads are located. As clearly shown in Figs. 2 and 3 each collar is divided at or near a diameter and the parts suitably secured together around the shaft as by bolts 15. The collars are prevented from turning relatively to the shaft in any suitable way, as by keys 16 secured in suitable recesses in the collars by screws 17.

Surrounding the shaft and the thrust collars is a bearing housing 18 shown as having an oil drain plug 19 at the bottom and an oil inlet pipe 20 at the top. Within the housing near each end is a filler piece 21 which may be omitted if desired.

Adjacent to each filler piece is a base ring 22, shown in detail in Figures 5 and 6, which for convenience of assembly and disassembly may be made of segmental construction, i. e., split or subdivided into two or more parts, and which parts may be held together by bolts 24 or in any other suitable way if desired. Mounted on each base ring is a bearing member of any suitable construction, shown as comprising a plurality of bearing segments or shoes 26, and interposed between said base ring and said bearing member are means for equitably distributing or equalizing the pressure on said bearing member.

In the construction illustrated, each base ring has the form of an annular channel with an inner flange 28 and an outer flange 29. Extending radially outward from the inner flange 28 are a plurality of spaced lugs 30, shown as annually grooved at 31 to receive a circular spring or key 32. The flange 28 near its outer end is also provided with an annular slot or groove 33. The flange 29 has a plurality of spaced lugs 34 designed to extend axially between the bearing segments or shoes 26 and prevent their rotation with the collar 13.

Mounted within the channel of each base ring are means for equitably distributing or equalizing the load among the several bearing segments or shoes cooperating therewith. In the form shown, said equalizing means comprises a plurality of equalizer blocks or plates 25, each of which has the form of a ring sector and is provided with a surface 37 beveled slightly from a central radial plane to provide a blunt knife-edge support 38. Each plate may also have its radial edges chamfered or rabbeted to provide tongues or shoulders 41 which cooperate to form lapped joints when the plates are assembled as shown in Figure 7. Alternating plates are mounted with their knife-edge bearing surfaces 38 resting on the bottom surface 42 of the channel-shaped base ring, while the intermediate alternating plates are mounted with their ends in overlapping relationship with the adjacent ends of the successive plate of the first series so as to bridge the spaces between said plates, said plates of the second series having their knife-edge bearing surfaces 38 directed in the opposite direction to provide bearing surfaces for the shoes 26. The equalizing means provided by this sub-divided structure of interrelated members occupies very small space axially and thereby saves materially in the axial space occupied by the entire bearing.

The equalizer plates 25 are held in proper circumferential or longitudinal relationship in any suitable way. In the form shown they are held against longitudinal or circumferential displacement by the engagement of lugs 39 formed thereon with the notches 40 formed between the lugs 30 on the flange 28 of the base ring 22, and are held against accidental axial displacement—in assembling or disassembling the structure—by the circular key 32 which is engaged in the groove 31 in said flange. There is, however, sufficient play or clearance between the lugs 39 and the parts associated therewith to permit the equalizer plates, which may tilt longitudinally or circumferentially but not radially with respect to the axis of the bearing, to tilt or rock freely about radial axes in said circumferential or longitudinal direction and thereby perform their intended equalizing function.

The bearing segments or shoes 26 also have the form of ring sectors and, in the form shown, each of them has a circumferential groove 43 in its inner edge, forming an annular tongue or projection 44 which is designed to engage in the groove 33 in flange 28 of the base ring. These projections and grooves are so constructed that the parts fit loosely, so as not to interfere with the proper tilting of the shoes in the formation of oil wedges in accordance with the principles of automatic lubrication disclosed in my prior patents.

Each shoe is preferably provided with a spherically curved projection on its rear face for engagement with one of the series of bridging plates 25, said projection, in the form shown, being provided by a hardened plug or button 46 set into a recess 47 in the rear face of the shoe. Each shoe is thereby mounted so that it is free to tilt in both circumferential and radial directions with respect to the axis of the bearing. The bearing shoes are therefore free to cooperate properly with the bearing surface of the collar even though the latter may be distorted by reason of the heating of the bearing in operation or other cause, and are also free to assume the proper position for wedging the lubricating fluid between the bearing surfaces.

The system of equalizer plates 25 constitutes a substantially-continuous longitudinally or circumferentially flexible equalizing structure which acts to uniformly distribute the bearing pressure among the several bearing segments or shoes, and thus not only equalizes the load and the wear thereon, but also facilitates the prompt and uniform formation of the desired wedge-shaped oil films between the bearing segments and the thrust collar.

The equalizer plates being relatively thin, the equalizing ring as a whole occupies a vary small axial space. Furthermore, the equalizer plates, being each tiltably or pivotally mounted on a blunt knife-edge, have a considerable length of contact with the base and are therefore well adapted for heavy loads. The means for holding the shoes and equalizer plates in position are such as to greatly facilitate the assembling or disassembling of the bearing; furthermore, the shoes may be readily inserted and withdrawn in a radial direction when a section of the housing is removed.

The housing 18 may be split or subdivided as clearly shown in Figure 4, so that the upper half may be readily removed to inspect the bearing or to remove and replace parts thereof as desired. Therefore, in the structure of my present invention the upper half of the housing may be removed at will and it is then possible to remove the bearing shoes, the equalizer plates, the parts of the thrust collar, and the parts of the base ring, as desired.

Furthermore, the equalizing means, while effectively providing for the uniform distribution of the thrust pressures over the several bearing segments or shoes, so cooperates with each segmental base ring that the reactionary forces are all axial or parallel to the shaft. In other words, there is no component of the thrust pressures which tends to burst the base ring or separate its parts; in fact the parts of the base ring may be merely set in position and the bolts 24 omitted if desired. The equalizing means described and illustrated herein is one mechanical expression of the generic invention disclosed and claimed in my application Serial No. 80,569, filed Feb. 26, 1916, of which this application is a continuation in part so far as relates broadly to a flexible substantially continuous but sub-divided pressure-distributing or equalizing structure which has only longitudinal or circumferential flexibility.

While the embodiment illustrated on the drawings has been described with considerable particularity, it is to be understood that the invention is not limited thereto, as the same is capable of receiving a variety of mechanical expressions, some of which will readily suggest themselves to those skilled in the art, while certain features thereof may be used without other features thereof. Reference is therefore to be had to the appended claims for a definition of the limits of the invention.

What I claim is:

1. In a thrust bearing the combination with a shaft having a thrust surface and a plurality of bearing shoes cooperating therewith, of a split housing, a split base ring set into the housing, and substantially continuous annular means for equalizing the pressure among the several shoes, said means being formed and arranged to exert pressure on the base ring without tending to spread the parts thereof.

2. In a thrust bearing the combination with a shaft having a thrust surface and a plurality of bearing shoes cooperating therewith, of a split housing, a split base ring set into the housing, and equalizing means comprising a relatively thin subdivided ring interposed between the base ring and the bearing shoes, the parts of said equalizing means being formed and arranged to exert pressure on the base ring without tending to spread the parts thereof.

3. In a thrust bearing the combination with a shaft having an enlargement, a subdivided thrust collar carried by said enlargement and a plurality of bearing shoes cooperating with said thrust collar, of a split housing, a subdivided base ring in the housing, and equalizing means comprising a relatively thin subdivided ring interposed between the base ring and the bearing shoes, said equalizing means being constructed and arranged to exert axial force only, on said base ring.

4. In a thrust bearing, the combination with a shaft, an enlargement thereon having a central annular groove dividing the enlargement into two rings, a subdivided thrust collar removably secured to each enlargement ring and a plurality of bearing shoes cooperating with each of said thrust collars, of a split housing, a subdivided base ring in the housing on each side of the enlargement, and interposed equalizing means between the shoes and the corresponding base ring constructed and arranged to exert only axial pressure on the base ring whereby there is no tendency to spread the parts.

5. An equalizing means for thrust bearings comprising an annular channel, a plurality of equalizer plates mounted in said channel to tilt only in a circumferential direction with respect to the axis of the bearing, and equalizer plates mounted on and bridging the space between adjacent ones of said first-named equalizer plates and constituting bearing members for the bearing shoes.

6. An equalizing means for thrust bearings comprising a base ring having a plurality of notches therein, equalizer plates mounted on said ring to tilt only in a circumferential direction with respect to the axis of the bearing, and having lugs extending into the notches of said ring, and equalizer plates mounted on and bridging the space between adjacent one of said first-named equalizer plates and constituting bearing members for the bearing shoes.

7. An equalizing means for thrust bearings comprising a base ring having a plurality of notches formed therein, equalizer plates mounted on the base ring to tilt only in a circumferential direction with respect to the axis of the bearing, and having lugs extending into alternate notches of the base ring, and equalizer plates mounted on and bridging the space between adjacent ones of said first-named equalizer plates and having lugs extending into alternate notches of the base ring, said last-named equalizer plates constituting bearing members for the bearing shoes.

8. A thrust bearing comprising a base ring, a plurality of equalizer plates mounted on said base ring to tilt only in a circumferential direction with respect to the axis of the bearing, equalizer plates mounted on and bridging the space between adjacent ones of said first-named equalizer plates, and bearing shoes mounted on said last-named equalizer plates to tilt both radially and circumferentially with respect to the axis of the bearing.

9. A thrust bearing comprising a base ring having a plurality of notches therein, equalizer plates mounted on said ring to tilt only in a circumferential direction with respect to the axis of the bearing and having lugs extending into alternate notches of the base ring, equalizer plates mounted on and bridging the space between adjacent ones of said first-named equalizer plates and having lugs extending into alternate notches of the base ring, and bearing shoes mounted on said last-named equalizer plates to tilt both radially and circumferentially with respect to the axis of the bearing.

10. A thrust bearing comprising a channel-shaped base ring having a plurality of notches formed in one wall, equalizer plates mounted in the channel to tilt only in a circumferential direction with respect to the axis of the bearing and having lugs extending into alternate notches of the base ring, equalizer plates mounted on and bridging the space between adjacent ones of said first-named equalizer plates and having lugs extending into alternate notches of the base ring, a circular key for holding the equalizer plates in position without interfering with their equalizing action, and bearing shoes tiltably mounted on said last-named equalizer plates.

11. A thrust bearing comprising a base ring, a plurality of equalizer plates mounted on said base ring to tilt only in a circumferential direction with respect to the axis of the bearing, equalizer plates mounted on and bridging the space between adjacent ones of said first-named equalizer plates, and bearing shoes each having a spherically-faced projection engaging one of said last-named equalizer plates.

12. A thrust bearing comprising a segmental annular base ring, a plurality of bearing shoes, and equalizing means between said base ring and bearing shoes comprising tiltable, overlapping equalizer plates, said plates being mounted to tilt only in a circumferential direction with respect to the axis of the bearing.

13. A thrust bearing comprising a segmental annular base ring, a plurality of bearing shoes, and equalizing means between said base ring and bearing shoes comprising a flexible ring having only longitudinal flexibility.

14. A thrust bearing comprising a segmental annular base ring, a plurality of bearing shoes, and a subdivided equalizing ring between said base ring and bearing shoes, the parts of said equalizing ring having movement only circumferentially with respect to the axis of the bearing whereby only axial pressure is exerted on said base ring.

15. An equalizing means for bearings comprising a sub-divided base ring, a plurality of equalizer plates mounted on said ring to tilt only in a circumferential direction with respect to the axis of the bearing, and equalizer plates mounted on and bridging the space between adjacent ones of said first-named equalizer plates and constituting bearing members for the bearing segments.

16. In a bearing, the combination with a shaft having a bearing surface and a plurality of bearing segments cooperating therewith, of a sub-divided base ring, and means for automatically equalizing the pressure among the several bearing segments, said means being formed and arranged to exert pressure on the base ring without tending to spread the parts thereof.

17. In a bearing, the combination with a shaft having a bearing surface and a plurality of bearing segments cooperating therewith, of a sub-divided base ring, and means for automatically equalizing the pressure among the several bearing segments, said equalizing means comprising a substantially continuous but sub-divided ring having its parts formed and arranged to exert only axial pressure on said base ring.

18. In a bearing, the combination with a shaft having a bearing surface and a plurality of bearing segments cooperating therewith, of a sub-divided base ring, and means for automatically equalizing the pressure among the several bearing segments, said equalizing means comprising a circumferentially flexible ring mounted on said base ring so as to exert only axial pressure thereon.

19. In a bearing, the combination with a shaft having a bearing surface and a plurality of bearing segments cooperating therewith, of a sub-divided base ring, and means for automatically equalizing the pressure among the several bearing segments, said equalizing means comprising an annular series of overlapping plates mounted on said base ring to tilt only circumferentially with respect to the axis of the bearing.

20. In a bearing, the combination with a shaft having a bearing surface and a plurality of bearing segments cooperating therewith, of a base ring, a series of tiltable equalizer plates mounted on said base ring, and a series of plates bridging said first mentioned plates and on which said bearing segments are mounted, said tiltable equalizer plates being mounted to tilt only in a circumferential direction with respect to the axis of the bearing.

21. In a bearing, the combination with relatively rotatable bearing members having their surfaces in bearing engagement, of means for equitably distributing the pressure on said members comprising a series of interrelated plates mounted to tilt only circumferentially with respect to the axis of the bearing.

22. In a bearing, the combination with relatively rotatable bearing members comprising a plurality of bearing segments, of means for equitably distributing the pressure on said segments comprising a series of interrelated plates mounted to tilt only circumferentially of the axis of the bearing and on which said segments are tiltably mounted.

23. In a bearing, the combination with relatively rotatable bearing members comprising a plurality of bearing segments, of means for equitably distributing the pressure on said segments comprising a series of interrelated plates mounted to tilt only circumferentially of the axis of the bearing, said segments being mounted on said pressure-distributing means to tilt both radially and circumferentially with respect to the bearing axis.

24. In a bearing, the combination of relatively rotatable bearing members including a plurality of bearing segments and means for equitably distributing the pressure on said segments comprising a base, a plurality of members mounted on said base to pivot only about radial axes and members bridging adjacent ends of said first-named members and on which said segments are mounted.

25. In a bearing, the combination of relatively rotatable bearing members including a plurality of bearing segments and means for equitably distributing the pressure on said segments comprising a base, a plurality of plates having knife-edge engagement with said base and other plates bridging adjacent ends of said first-named plates and on which said segments are mounted.

26. In a bearing, the combination of relatively rotatable bearing members having their surfaces in bearing engagement and means for equitably distributing the pressure thereon comprising a substantially-continuous interrelated series of tiltably-mounted members constituting an equalizing structure which is possessed of only longitudinal or circumferential flexibility.

27. In a bearing, the combination of relatively rotatable bearing members having their surfaces in bearing engagement and means for equitably distributing the pressure thereon comprising a sub-divided flexible equalizing structure which has only longitudinal or circumferential flexibility.

28. In a bearing, the combination of relatively rotatable bearing members having their surfaces in bearing engagement and means for equitably distributing the pressure thereon comprising an overlapping series of plates mounted to tilt only circumferentially of the axis of the bearing.

29. In a bearing the combination of a base, a plurality of rocking members engaging said base along radial lines, members bridging the spaces between said rocking members, and bearing segments mounted on said bridging members.

30. In a bearing, the combination of a base, a series of members mounted thereon to tilt in a circumferential direction only, a second series of members bridging the ends of the members of the first series, the two series constituting a substantially-continuous flexible equalizing structure, and bearing segments mounted on said second series of members.

31. In a bearing, the combination of a base, a series of members mounted thereon to tilt in a circumferential direction only, a second series of members each having its opposite ends in overlapping relationship with adjacent ends of succeeding members of the first series, and a bearing segment mounted on each member of the second series.

32. An equalizing structure comprising an overlapping series of cooperating pressure distributing members adapted to be mounted on a base so as to tilt only longitudinally of the series.

33. In a bearing, the combination of relatively movable bearing members, a base for one of said bearing members, and means interposed between said base and its associated bearing member for equitably distributing the bearing pressure thereon, said pressure distributing means comprising a plurality of members mounted on said base to tilt only in a longitudinal or circumferential direction, and a plurality of members bridging the spaces between said tiltable members and supporting the associated bearing member.

34. A thrust bearing comprising a channel-shaped base ring, equalizing means mounted in the channel of said base ring, a plurality of bearing segments mounted on said equalizing means, and means including a loosely engaging tongue and groove connection between said segments and said base ring for retaining said segments in position on said equalizing means.

35. A bearing comprising a base ring, a plurality of equalizer plates mounted on said base ring to tilt only in a circumferential direction with respect to the axis of the bearing, equalizer plates mounted on and bridging the space between adjacent ends of said first-named equalizer plates and bearing shoes tiltably mounted on said last-named equalizer plates.

36. In a bearing, the combination with a shaft provided with a sub-divided thrust collar and bearing segments cooperating therewith, of a split housing, a sub-divided base ring in said housing, and equalizing means interposed between said base ring and said bearing segments, said equalizing means comprising a sub-divided ring adapted to exert only axial pressure on said base ring.

37. In combination with a bearing member, pressure distributing means coacting therewith and comprising a plurality of members mounted to rock on knife-edge supports, and members coacting with the adjacent ends of successive rocking members and on which said bearing member is mounted.

38. In combination with a bearing member, pressure distributing means coacting therewith and comprising a plurality of members mounted to rock only longitudinally or circumferentially of said bearing member, and members coacting with the adjacent ends of successive rocking members and on which said bearing member is mounted.

In witness whereof, I have hereunto set my hand this 27th day of December, 1917.

ALBERT KINGSBURY.